(12) United States Patent
Suganuma

(10) Patent No.: US 7,220,371 B2
(45) Date of Patent: May 22, 2007

(54) WIRE GRID POLARIZER AND METHOD FOR PRODUCING SAME

(75) Inventor: Takayoshi Suganuma, Hasuda (JP)

(73) Assignee: Enplas Corporation, Saitama (JP)

( * ) Notice: Subject to any disclaimer, the term of this patent is extended or adjusted under 35 U.S.C. 154(b) by 134 days.

(21) Appl. No.: 10/925,638

(22) Filed: Aug. 24, 2004

(65) Prior Publication Data
US 2005/0046943 A1   Mar. 3, 2005

(30) Foreign Application Priority Data
Aug. 25, 2003 (JP) .............................. 2003-300414

(51) Int. Cl.
B29D 11/00 (2006.01)
G02B 5/30 (2006.01)

(52) U.S. Cl. .................. 264/1.31; 205/79; 264/2.7; 427/163.1

(58) Field of Classification Search ................. 214/1.1, 214/1.31, 2.6, 2.7; 427/162, 163.1; 264/1.34; 205/76, 77, 79
See application file for complete search history.

(56) References Cited

U.S. PATENT DOCUMENTS 6,375,870 B1 * 4/2002 Visovsky et al. .......... 264/1.31

6,813,077 B2 * 11/2004 Borrelli et al. ............. 359/486

FOREIGN PATENT DOCUMENTS

| JP | 5-208844 | 8/1993 |
|----|----------|--------|
| JP | 10-153706 | 6/1998 |
| JP | 2003-43257 | 2/2003 |

* cited by examiner

Primary Examiner—Mathieu D. Vargot
(74) Attorney, Agent, or Firm—Bachman & LaPointe, P.C.

(57) ABSTRACT

There are provided a thin wire grid polarizer having a high transmittance, a high quenching ratio and a high degree of polarization, and a method for producing the same at low costs. A fluoridated polyimide thin film 12, a hydrophilic thin film 13 and a hydrophobic thin film 14 are sequentially stacked on a glass substrate 11 to be pressed by a die 1 from the side of the hydrophobic thin film 14 to transfer the fine pattern of groove forming protrusions 3 of the die 1 to the hydrophobic thin film 14 and hydrophilic thin film 13 by the nano-imprinted lithography technique, and then, metal fine wires are caused to grow by plating.

11 Claims, 11 Drawing Sheets

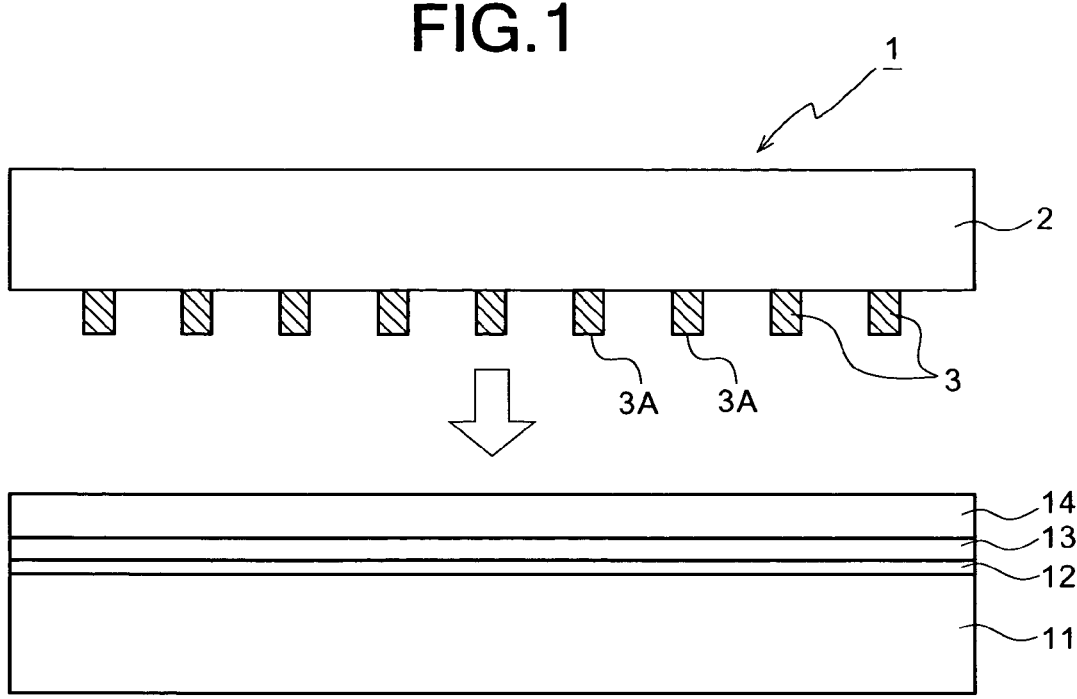
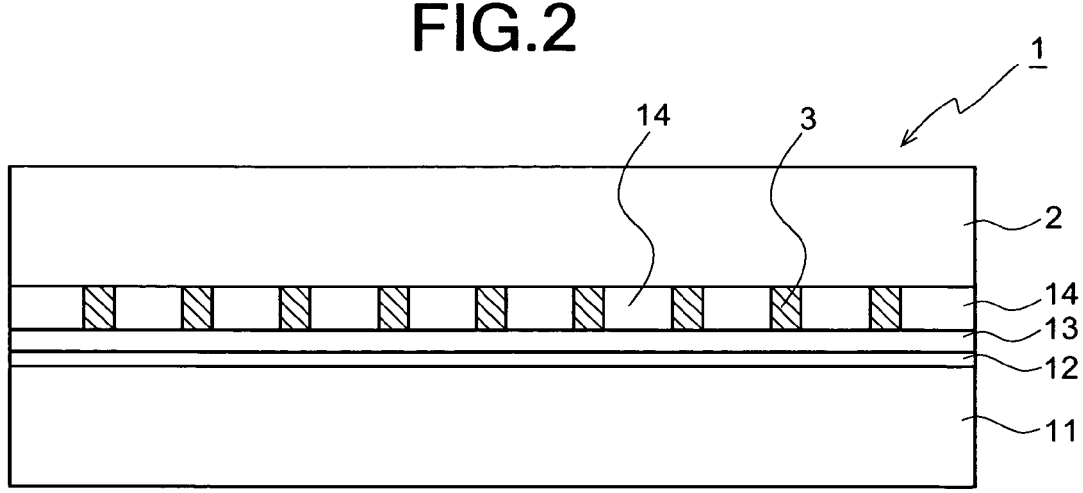

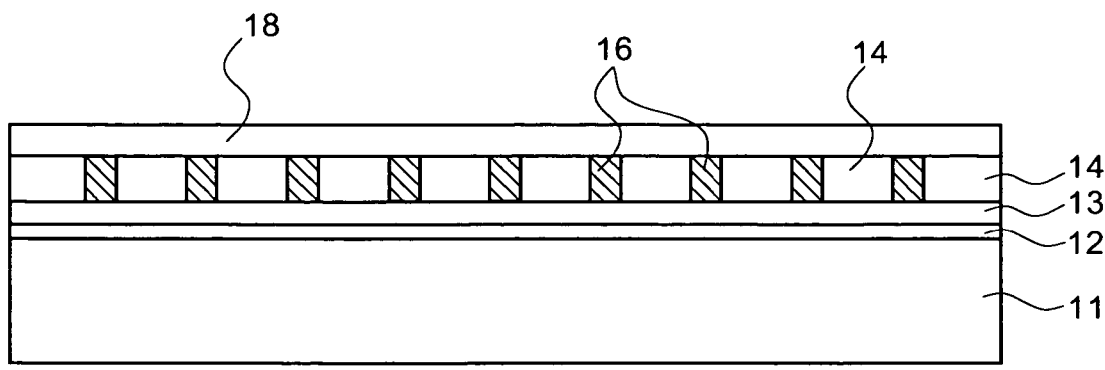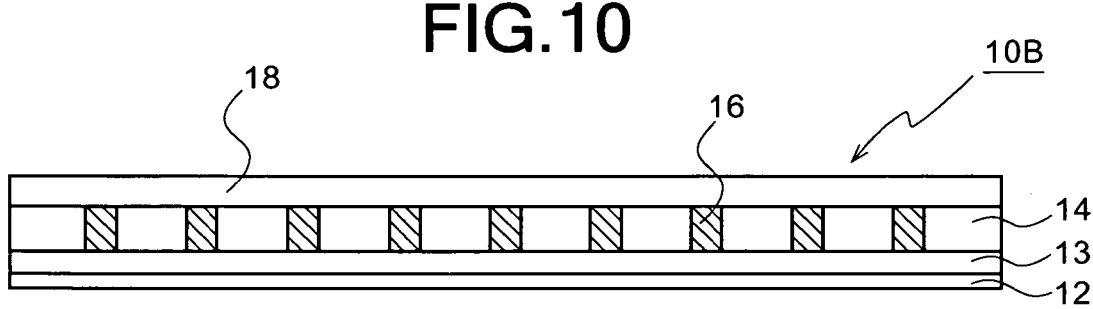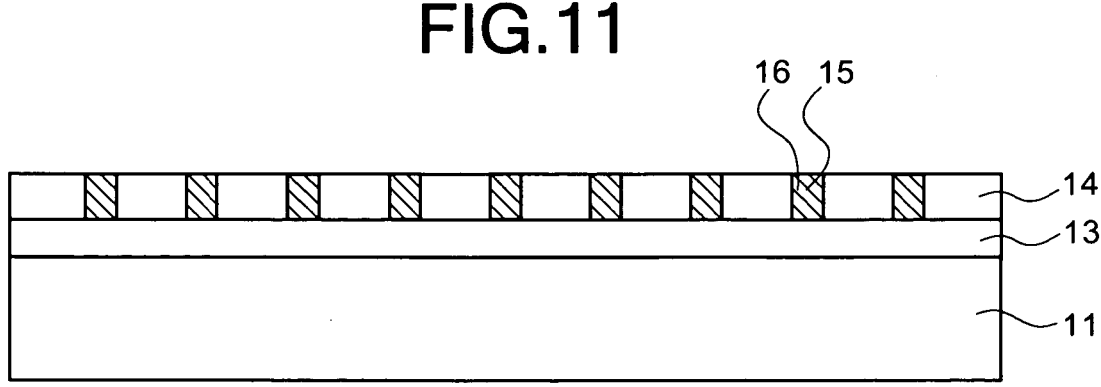

WIRE GRID POLARIZER AND METHOD FOR PRODUCING SAME

BACKGROUND OF THE INVENTION

1. Field of the Invention

The present invention generally relates to a wire grid polarizer and a method for producing the same. More specifically, the invention relates to a wire grid polarizer which is used for optical communication, optical recording, display or the like, and a method for producing the same.

2. Description of the Prior Art

As an example of a polarizer, there is widely known a polarizer utilizing optical anisotropy which is obtained by extending or orienting a high polymer film (see, e.g., Japanese Patent Laid-Open No. 2003-43257). Such a polarizer of a high polymer film is mainly used for a display, such as a liquid crystal panel. However, there are problems in that the heat resistance, moisture resistance and chemical resistance of the polarizer disclosed in Japanese Patent Laid-Open No. 2003-43257 are low, and that the light transmittance and quenching ratio as optical characteristics thereof are also low, although there is an advantage in that it can be produced in large quantities at low costs, since it is produced by using a high polymer film.

As an example of a polarizer having excellent heat resistance, moisture resistance and chemical resistance, there is known a polarizer using a polar core (produced by Coning, Co., Ltd.). The polar core is formed by arranging silver particles in one direction in a glass. The polar core is heated and extended or oriented so as to have polarization characteristics after a metal compound is dispersed in a glass, and it can be used as a polarizer. Such a polarizer has more excellent optical characteristics than those of organic polarizers using high polymer films. There are also known a copper containing polarizing glass which utilizes copper in place of silver, and a method for producing the same (see, e.g., Japanese Patent Laid-Open No. 5-208844). However, it is not easy to produce the polarizer using the polar core and the polarizer disclosed in Japanese Patent Laid-Open No. 5-208844. That is, after a metal compound is dispersed in a glass, it is required to reduce the metal compound, and it is required to heat and extend or orient the glass in one direction. In this case, since it is required to carry out reduction and deposition in a specific gas at a high temperature, there is a problem in that it is required to use a special equipment for carrying out such processes, so that costs are increased. In addition, it is required to carry out heating and extension or orientation, so that it is difficult to produce a large-area polarizer at a time.

By the way, there is known a wire grid polarizer wherein a large number of metal fine wires are formed on a transparent substrate so as to extend in parallel to each other (see, e.g., Japanese Patent Laid-Open No. 10-153706). This wire grid polarizer is produced by applying a resist on a transparent substrate, patterning the resist by the electron beams (EB) lithography or X-ray lithography, and leaving metal fine wires on the transparent substrate by the lift-off method.

However, in a method for producing the wire grid polarizer disclosed in Japanese Patent Laid-Open No. 10-153706, the electron beam (EB) lithography system is unsuitable for the writing in a wide area, since the writing area at a time is small and since it takes a lot of writing time. The X-ray lithography is not a desired method in view of mass productivity and production costs in the present circumstances, since the X-ray lithography system is very expensive and uses a very expensive photomask. In addition, in the method for producing the wire grid polarizer, part of metal pieces lifted off are residual to cause the deterioration of characteristics, and if an expensive noble metal is used, most of metal portions lifted off are useless materials, so that costs are increased.

There are many reports with respect to polarizers utilizing metal wire grids. As shown in FIG. 25, a wire grid polarizer 100 basically has a structure that a large number of metal wires 102 extending in parallel to each other are arranged on a transparent substrate 101 at intervals. In the wire grid polarizer 100 shown in FIG. 25, the metal wires 102 are so set as to have a predetermined period $\Lambda$, a predetermined width d and a predetermined thickness t.

When the wire grid polarizer 100 transmits p waves (electromagnetic radiation polarized in parallel to a grid) and damps s waves (electromagnetic radiation polarized in a direction perpendicular to the grid) in transmission characteristics, it is ideal to realize a polarizer having a higher transmittance ratio (Tp/Ts) a smaller loss in transmittance of p wave polarized light on the transmission side, a high quenching ratio and a small loss in a wide band. Thus, it is required to prevent higher-order diffracted light beams from being produced, and it is required to make the wire period $\Lambda$ half wavelength or less. Moreover, in order to realize a high quenching ratio in a wide band wavelength, it is known that metal fine wires must be produced at a period about one-fifth of wavelength. That is, it is known that this polarizer can be optically regarded as a diffraction grating for sub-wavelength, and that optical characteristics can be very precisely predicted by the strict wave coupling method (RCWA).

FIGS. 26 and 27 show the results of characteristics predicted by the RCWA, i.e., the transmittance and quenching ratio of each of p and s waves in a wavelength band of 50 to 800 nm. As conditions in this case, there are metal wires of gold (n=0.0033, k=4.71), a glass substrate BK-7 (n=1.41), $\Lambda$=100 nm, d=40 nm and t=170 nm. As shown in FIG. 26, although the quenching ratio decreases as the wavelength decreases, a good value of 29 dB or more is also ensured at 500 nm (0.5 μm).

However, it is difficult to work a very fine polarizer required as the above described polarizer. First, the wire grid must be formed at a period of about 90 nm which is $\lambda/5$ in a wavelength band of visible light of 450 to 650 nm. It is also known that, if the period and width are smaller than $\lambda/5$, the quenching ratio can be further improved to realize a high quenching ratio in a wide band. Conventionally, in order to form such a fine pattern, ultraviolet and a photomask are usually used for forming a fine pattern on a photoresist. Until now, a pattern having a size of about 230 nm can be formed at the smallest even if an i-line stepper is used. In recent years, there are exposure systems using eximer laser light, such as ArF or KrF, which has a shorter wavelength. However, there is a problem in that these systems are very expensive in comparison with the i-line stepper which is a conventional exposure system.

As a method expected to be capable of solving such problems of the conventional exposure systems, there is the nano-imprint lithography method. However, even if the nano-imprint lithography method is used, a problem remains when metal wires having a size of 100 nm or less are precisely and repeatably formed in a large area.

SUMMARY OF THE INVENTION

It is therefore an object of the present invention to eliminate the aforementioned problems and to provide a thin wire grid polarizer having a high transmittance, a high quenching ratio and a high degree of polarization, and a method for producing the same at low costs.

In order to accomplish the aforementioned and other objects, according to one aspect of the present invention, a wire grid polarizer comprises: a light transmissible substrate; a thin film layer of a light transmissible hydrophilic resin formed on the light transmissible substrate; and a plurality of metal fine wires formed on the thin film layer so as to protrude from the thin film layer, the plurality of metal fine wires extending in parallel to each other and being spaced from each other at fine intervals.

This wire grid polarizer may further comprise a protective layer of a light transmissible hydrophobic resin formed on the thin film layer between adjacent two of the plurality of metal fine wires. Alternatively, the wire grid polarizer may further comprise a protective layer of a light transmissible hydrophobic resin on the thin film layer so as to surround the plurality of metal fine wires.

According to another aspect of the present invention, there is provided a method for producing a wire grid polarizer, the method comprising the steps of: forming an underlayer on a substrate; forming a thin film layer of a hydrophobic resin on the underlayer; preparing a die having a plurality of protrusions which extend in parallel to each other and which are spaced from each other at fine intervals; pressing the plurality of protrusions of the die on the thin film layer of the hydrophobic resin to form a plurality of metal fine wire forming grooves in the thin film layer of the hydrophobic resin so as to expose the underlayer by the plurality of metal fine wire forming grooves; and forming each of a plurality of metal fine wires in a corresponding one of the plurality of metal fine wire forming grooves.

This method may further comprise the steps of: forming a light transmissible mold releasing layer on the substrate before forming the underlayer, so as to allow the underlayer to be formed on the substrate via the light transmissible mold releasing layer; and removing the substrate from the light transmissible mold releasing layer after the plurality of metal fine wires are formed.

In the above described method, the plurality of protrusions of the die may be pressed on the thin film layer of the hydrophobic resin so as to reach the underlayer to form the plurality of metal fine wire forming grooves at one step. The plurality of metal fine wires may be formed by a plating method.

In the above described method, the underlayer may be a metal thin film. In this case, the above described method may further comprise a step of removing portions of the metal thin film, on which the plurality of metal fine wires are not formed, after the step of forming the plurality of metal fine wires. Alternatively, the underlayer may be a thin film of a light transmissible hydrophilic resin.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 1 is a sectional view showing a step in the first preferred embodiment of a method for producing a wire grid polarizer according to the present invention (a state before a die is pressed in a nano-imprint lithography process);

FIG. 2 is a sectional view showing a step in the first preferred embodiment of a method for producing a wire grid polarizer according to the present invention (a state that the die is pressed in the nano-imprint lithography process);

FIG. 9 is a sectional view of a step (a protective film forming step) in the second preferred embodiment of a method for producing a wire grid polarizer according to the present invention;

FIG. 10 is a sectional view of a wire grid polarizer in the second preferred embodiment;

FIG. 11 is a sectional view of a step (a plating step) in the third preferred embodiment of a method for producing a wire grid polarizer according to the present invention;

DESCRIPTION OF THE PREFERRED EMBODIMENTS

Figure 3:
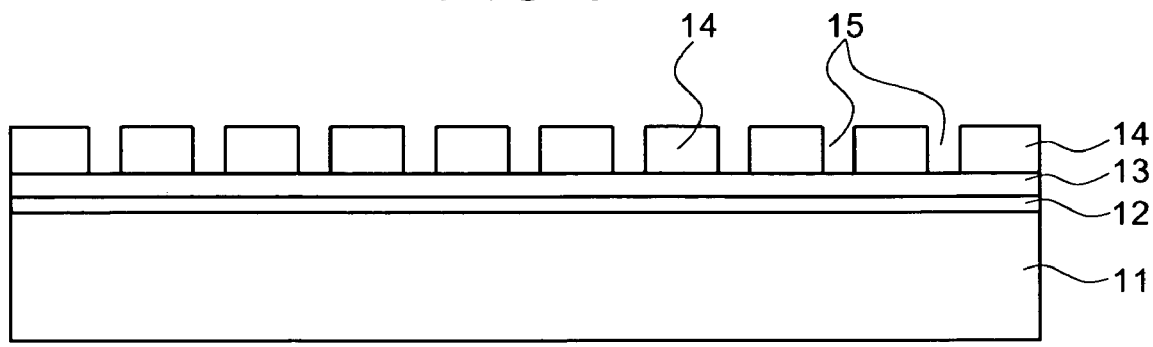
FIG. 3 is a sectional view showing a step in the first preferred embodiment of a method for producing a wire grid polarizer according to the present invention (a state that the die is removed in the nano-imprint lithography process)

Referring now to the accompanying drawings, the preferred embodiments of a wire grid polarizer and a method for producing the same according to the present invention will be described below in detail.

In a preferred embodiment of the present invention, in order to form metal fine wires of a very fine metal pattern, a pattern having a very fine period structure (a structure that protrusions are arranged in parallel at a very fine period), which is formed on the surface of a die, is transferred by the nano-imprint lithography technique.

The die will be briefly described below. The die is mainly made of silicon (Si) or quartz. The die may be produced by the following procedures.

First, a metal thin film having a predetermined thickness is deposited on a substrate of Si or quarts by a technique, such as sputtering. Then, a resist (an electron beam resist) is applied on the metal thin film. The resist is exposed to electron beams by the electron beam (EB) lithography, and is developed to obtain a desired resist pattern. Thereafter, the resist pattern is used as a mask for carrying out, e.g., dry etching, to work the metal thin film to form a plurality of groove forming protrusions (metal thin film workpiece) for forming grooves in a hydrophobic thin film which will be described later. Then, the resist pattern is peeled off to complete the die.

Furthermore, an inverted pattern of metal fine wires (a wire grid) to be worked is previously formed in the die. That is, the width and interval of the groove forming protrusions formed by working the metal thin film of the die are set to be the same as those of metal fine wires of a wire grid polarizer which will be described later.

The die thus produced can be used as a die as it is. However, after a metal film of nickel (Ni) or the like is deposited on the surface of the die substrate on which the groove forming protrusions are formed, the thickness of the Ni layer is increased by the electroforming process technique, and thereafter, the Ni layer may be peeled off from the substrate to be used as a die. Thus, the die or mold can be obtained.

A method for producing a wire grid polarizer using the above described die will be described below.

First, a substrate of a wire grid polarizer is prepared. This substrate may be made of a glass, such as BK-7, or a light transmissible synthetic resin. Furthermore, the substrate should not be limited to a plate-like substrate. For example, the substrate may be a thin film sheet of a polymer.

Then, a metal thin film (of Ni or the like if the substrate is made of Si or quarts) having a good adhesion to the substrate is deposited on one side of the substrate as an underlayer so as to have a thickness of, e.g., a few nanometers to hundreds nanometers. For example, this deposition can be carried out by the sputtering, CVD, electroforming or plating method. The underlayer serves as a substrate (growth species) for causing the growth of metal fine wires as a wire grid thereon.

Furthermore, the underlayer should not be limited to the above described metal thin film, and may be a transparent hydrophilic polymer film or the like. If the hydrophilic polymer film is thus used, metal fine wires grow on the film. Such a transparent hydrophilic polymer film may be a film obtained by irradiating, e.g., a product called Glassia (trade name), which is commercially available from Nippon Paint Co., Ltd., with ultraviolet. Alternatively, the polymer film may be a film obtained by irradiating a thin film of polyimide resin, epoxy resin or positive type photoresist with ultraviolet or by processing it with plasma, to make the surface thereof hydrophilic.

After the underlayer is formed, the whole surface of the substrate is coated with a hydrophobic thin film by means of, e.g., a spin coater, and is baked. This hydrophobic thin film may be obtained by applying a polymer, such as a photoresist or polymethyl methacrylate (PMMA) dissolved in an organic solvent, and baking it.

Thereafter, the above described die is set on a press machine to be pressed on the hydrophobic thin film at a predetermined pressure. At this time, the die is previously heated to a glass transition temperature of the hydrophobic thin film or higher. It is herein required to press the die at such a pressure that the fine pattern of the die is sufficiently transferred to the hydrophobic thin film. At this step, the pattern of the die is transferred to the hydrophobic thin film by at least the whole thickness of the film, so that recessed portions for forming metal thin wires are formed. The groove forming protrusions may sufficiently pass through the hydrophobic thin film to the underlayer by causing the underlayer underlying the hydrophobic thin film to be sufficiently thicker than the hydrophobic thin film so that the height of groove forming protrusions of the die is greater than the thickness of the hydrophobic thin film.

Then, after the die is sufficiently cooled to a temperature approximating a room temperature from the glass transition temperature of the hydrophobic thin film, the die is removed. At this time, if the hydrophobic thin film remains on the bottom portions of the grooves formed in the hydrophobic thin film, it may be dry-etched with $O_2$ plasma to remove the hydrophobic thin film on the bottom portions of the grooves so that the underlayer is exposed.

Thereafter, a surface treatment is carried out with a pretreatment solution for causing a metal material serving as a nucleus for growth to adhere to the substrate, before a metal plating is carried out. As this pretreatment solution, there is known a cyanic acid or alkali solution if the substrate is plated with gold (Au). By carrying out a surface treatment with such a pretreatment solution, there is caused a phenomenon that a portion to be a nucleus for growth adheres to the surface of the underlayer.

Thereafter, the substrate is immersed in a plating solution to carry out an electrolytic plating if the underlayer is a metal thin film, or an electroless plating if the underlayer is a hydrophilic resin thin film. Furthermore, as another plating method, a wet process, such as electroforming plating, may be used. The metal material for growing as metal fine wires may be any one of gold, silver, copper, aluminum, iron, nickel, titanium, tungsten, chromium and alloys thereof. Other metals and alloys may be used if they have a high absorptivity in a wavelength band in which the polarizer is used. Portions in which the metal grows by plating correspond to portions in the grooves wherein the underlayer is exposed. After metal fine wires are formed so as to have a predetermined thickness by such plating, the substrate is taken out of the plating solution. The metal fine wires formed by the above described procedures do not grow on the hydrophobic thin film, and grow on only groove portions (window portions), in which the underlayer contacts the plating solution, to form a metal wire grid of the metal material.

The wire grid polarizer produced by the above described method is arranged so that the underlayer is arranged on the light transmissible substrate and so that the plurality of metal fine wires forming the wire grid extend on the underlayer at intervals in parallel to each other. Furthermore, a transparent hydrophobic thin film may exist between the metal fine wires, or all of the metal fine wires on the underlayer may be covered with a protective film. If the underlayer is a metal thin film, the metal thin film does not exist between the metal thin wires.

The above described groove forming protrusions on the die are formed so as to have a fine pattern, since they are formed by the lithography technique using the electron beam exposure technique. The groove forming protrusions are transferred to the hydrophobic thin film to form a fine groove pattern, so that the metal fine wires growing by the plating method can be also formed so as to have a fine pattern. In particular, according to the present invention, the wire grid has such a period and width that it serves as a wire grid polarizer having a high transmittance, a high quenching ratio and a high degree of polarization in a wavelength band of visible light (450 to 650 nm). Specifically, the period and width of the wire grid (metal thin wires) may be smaller than $\lambda/5$.

Since the lift-off method is not used unlike conventional methods, it is possible to realize an inexpensive wire grid polarizer and method for producing the same, without losing the metal material of the metal thin wires.

[First Preferred Embodiment]

Referring now to the accompanying drawing, particularly to FIGS. 1 through 5, the first preferred embodiment of a wire grid polarizer and a method for producing the same according to the present invention will be described below.

First, as shown in FIG. 1, a die 1 for carrying out the nano-imprint lithography is prepared. The die 1 has a plurality of groove forming protrusions 3, which are formed on one side of a die substrate 2 of silicon or quarts by working a metal thin film, as an inverted pattern of metal fine wires (a wire grid) to be worked. That is, the width of each of the groove forming protrusions 3 of the metal thin film of the die 1, and the distance between adjacent two of the groove forming protrusions 3 thereof are set to be the same as the preset width and distance with respect to metal thin wires 16 of a wire grid polarizer 10 which will be described later. Furthermore, in the die 1, the period of the groove forming protrusions 3 (the distance between the centers of adjacent two of the groove forming protrusions 3 in width directions) is set to be about 90 nm.

On the other hand, a substrate on which the nano-imprint lithography is to be carried out by the die 1 is prepared.

First, as shown in FIG. 1, a glass substrate 11 is coated with a fluoridated polyimide thin film 12 as a mold releasing agent. The fluoridated polyimide thin film 12 functions as a peeling film later, and maybe, e.g., OPI-N2005 (produced by Hitachi Kasei Kogyo, Co., Ltd.).

Then, a hydrophilic thin film 13 serving as a transparent hydrophilic underlying thin film is formed on the fluoridated polyimide thin film 12.

Then, a photoresist or a polymer, such as PMMA, dissolved in an organic solvent is applied on the hydrophilic thin film 13 to be baked to form a hydrophobic thin film 14. Furthermore, the thickness of the hydrophobic thin film 14 is set to be slightly smaller than the height of the groove forming protrusions 3 of the die 1.

Thereafter, the above described die 1 and the glass substrate 11 are set on a press machine (not shown) so that the die 1 faces the hydrophobic thin film 14. At this time, the die 1 is previously heated to the glass transition temperature of the hydrophobic thin film 14 or higher.

Then, the die 1, the temperature of which is the glass transition temperature of the hydrophobic thin film 14 or higher, is moved as shown by the arrow in FIG. 1, to be pressed on the glass substrate 11 at a predetermined pressure as shown in FIG. 2. At this pressing step, the groove forming protrusions 3 bite into the hydrophobic thin film 14 while decreasing the viscosity of the hydrophobic thin film 14, so that the tip end faces 3A (see FIG. 1) of the groove forming protrusions 3 contact the hydrophilic thin film 13. Therefore, the distance by which the die substrate 2 finally approaches the glass substrate 11 by the press machine is preset so that the tip end faces 3A of the groove forming protrusions 3 reach the hydrophilic thin film 13, in view of the height of the groove forming protrusions 3 and the dimension of the stacked films on the side of the glass substrate 11.

Thereafter, the die 1 is sufficiently cooled to a temperature approximating a room temperature from the glass transition temperature of the hydrophobic thin film 14. Then, as shown in FIG. 3, the die 1 is removed from the glass substrate 11. As a result, metal thin wire forming grooves 15 are formed in portions of the hydrophobic thin film 14 of the glass substrate 11 from which the groove forming protrusions 3 of the die 1 are removed. The period of the metal fine wire forming grooves 15 is the same as that of the groove forming protrusions 3. Furthermore, if the hydrophilic thin film 14 remains on the bottom portions of the metal thin wire forming grooves 15, a plasma process or another dry process may be suitably carried out so that the hydrophilic thin film 13 is exposed on the bottom portions of the metal thin wire forming grooves 15.

Figure 4:
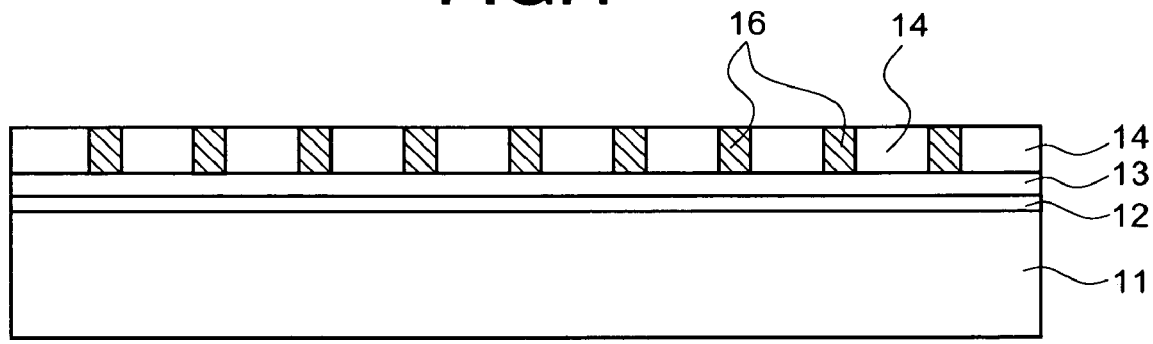
FIG. 4 is a sectional view showing a step (a plating step) in the first preferred embodiment of a method for producing a wire grid polarizer according to the present invention.

Then, the glass substrate 11 having the metal thin wire forming grooves 15 in the hydrophilic thin film 14 is immersed in a plating bath (not shown) to carry out electroless plating to cause metal fine wires 16 to grow in the metal fine wire forming grooves 15 as shown in FIG. 4. In this electroless plating, metal ions in the plating solution are deposited in accordance with the characteristics of the surface of the hydrophilic thin film 13, and the deposited metal is used as a nucleus for causing the metal fine wires 16 to grow in only the metal fine wire forming grooves 15. At this time, the metal fine wires 16 do not grow on the hydrophobic thin film 14. For example, at this plating step, anyone of gold, silver, copper, aluminum, iron, nickel, titanium, tungsten, chromium and alloys thereof may grow as the metal fine wires 16. Naturally, the width of each of the metal fine wires 16 is substantially the same as that of each of the groove forming protrusions 3 of the die 1, and the period of the metal fine wires 16 (the distance between the centers of adjacent two of the metal fine wires 16 in width directions) is substantially the same as that of the groove forming protrusions 3 of the die 1.

Figure 5:
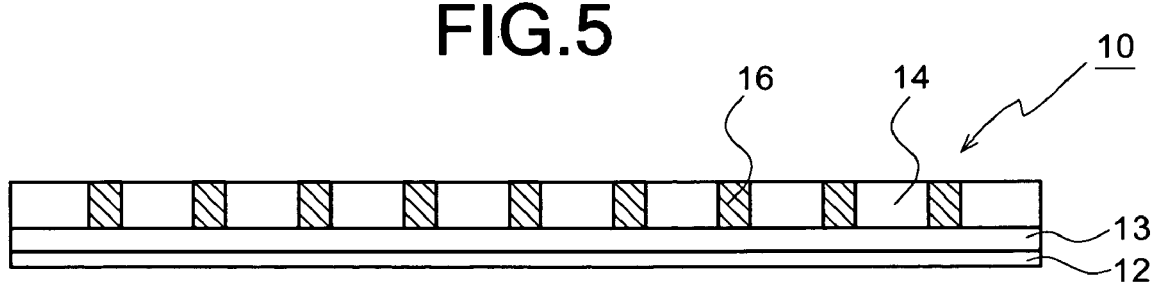
FIG. 5 is a sectional view of a wire grid polarizer in the first preferred embodiment.

Thereafter, the glass substrate 11 is peeled off from the fluoridated polyimide thin film 12, so that a wire grid polarizer 10 shown in FIG. 5 is completed.

Since the wire grid polarizer 10 produced in this preferred embodiment does not have the thick glass substrate 11, the wire grid polarizer 10 is very thin, so that there is an advantage in that the wire grid polarizer 10 is easily applied to, e.g., a liquid crystal display panel or a light oscillation source for optical fiber communication. In addition, since the materials of the wire grid polarizer 10 other than the material of the metal fine wires 16 are polymer materials, the wire grid polarizer 10 is flexible, so that the wire grid polarizer 10 can be provided on a mounting portion so as to extend along the mounting portion even if the mounting portion is curved.

Furthermore, while the glass substrate 11 has been used for producing the wire grid polarizer in the first preferred embodiment, a substrate of a synthetic resin may be used if it has a resistant to the plating solution.

Figure 6:
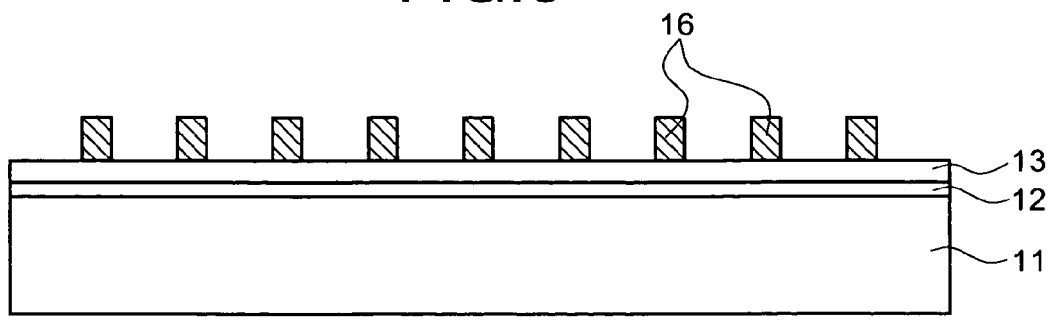
FIG. 6 is a sectional view showing a step in a state that a hydrophobic thin film is removed in a modified example in the first preferred embodiment.
Figure 7:
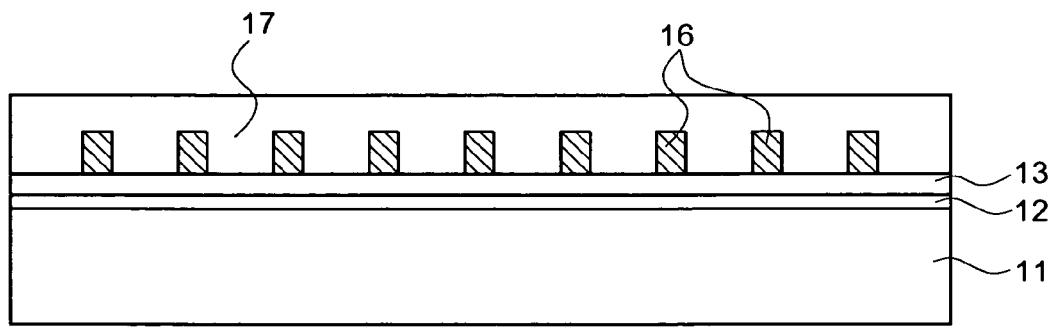
FIG. 7 is a sectional view showing a step in a state that a protective film is formed in the modified example in the first preferred embodiment.
Figure 8:
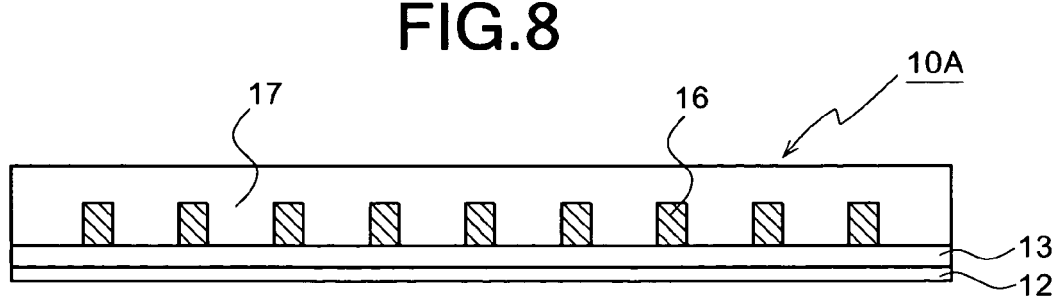
FIG. 8 is a sectional view of a wire grid polarizer in the modified example of the first preferred embodiment.

Referring to FIGS. 6 through 8, a modified example of the above described first preferred embodiment will be described below.

In this modified example, after the metal fine wires 16 are caused to grow in the metal fine wire forming grooves 15 of the hydrophobic thin film 14 as shown in FIG. 4 in the first preferred embodiment, the hydrophobic thin film 14 is removed while leaving the metal fine wires 16 as shown in FIG. 6. This step of removing the hydrophobic thin film 14 is carried out by using a solvent, in which only the hydrophobic thin film 14 is selectively dissolved, so that the underlying hydrophilic thin film 13 is not removed.

Thereafter, as shown in FIG. 7, the hydrophilic thin film 13 and the metal fine wires 16 are coated with a transparent protective film 17. The protective film 17 may be made of a polymer material, a dielectric material or the like. Furthermore, the refractive index and thickness of the protective film 17 may be controlled so as to decrease the Fresnel reflection.

After the protective film 17 is thus formed, the glass substrate 11 is peeled off from the fluoridated polyimide thin film 12 to complete a wire grid polarizer 10A shown in FIG. 8.

The wire grid polarizer 10A in this modified example can be a durable polarizer having a thin film structure by forming the protective film 17. As described above, since it is possible to prevent the Fresnel reflection by controlling the refractive index of the protective film 17 and the thickness of each of the thin films, the polarizer can have excellent optical characteristics. Furthermore, in the wire grid polarizer 10A in this modified example, the surface of the fluoridated polyimide thin film 12 may be coated with a reflection reducing film.

[Second Preferred Embodiment]

Referring to FIGS. 9 and 10, the second preferred embodiment of the present invention will be described below. In this preferred embodiment, the same steps as those shown in FIGS. 1 through 4 are carried out. After the metal fine wires 16 are caused to grow in the metal fine wire forming grooves 15 of the hydrophobic thin film 14 as shown in FIG. 4, the hydrophobic thin film 14 and the metal fine wires 16 are coated with a transparent protective film 18 as shown in FIG. 8. For example, in the process for forming the protective film 18, after the glass substrate 11 is set on the turntable of a spin coater, the glass substrate 11 may be spin-coated with the liquid material of the protective film 18 to be baked. Furthermore, the liquid material of the protective film 18 may be a resist or PMMA dissolved in an organic solvent, similar to the hydrophobic thin film 14.

Thereafter, as shown in FIG. 10, the glass substrate 11 is peeled off from the fluoridated polyimide thin film 12 to complete a wire grid polarizer 10B. Also in this preferred embodiment similar to the above described first preferred embodiment, it is possible to prevent the Fresnel reflection by controlling the refractive index of the protective film 18 and the thickness of each of the thin films. In addition, the surface of the fluoridated polyimide thin film 12 may be coated with a reflection reducing film. Furthermore, while the protective film 18 has been formed by spin-coating in this preferred embodiment, the protective film 18 may be formed by the vapor phase epitaxy method or the liquid deposition method.

[Third Preferred Embodiment]

Figure 12:
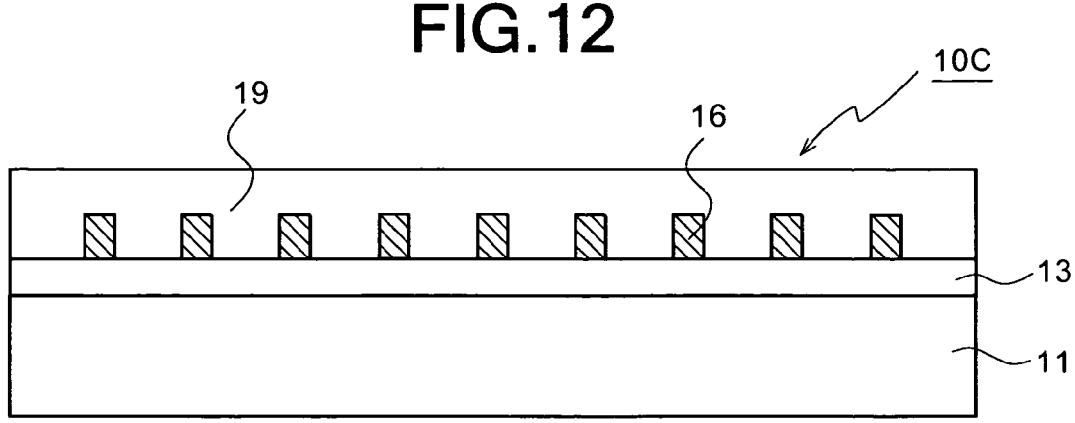
FIG. 12 is a sectional view of a step (a protective film forming step) in the third preferred embodiment of a wire grid polarizer according to the present invention.
Figure 13:
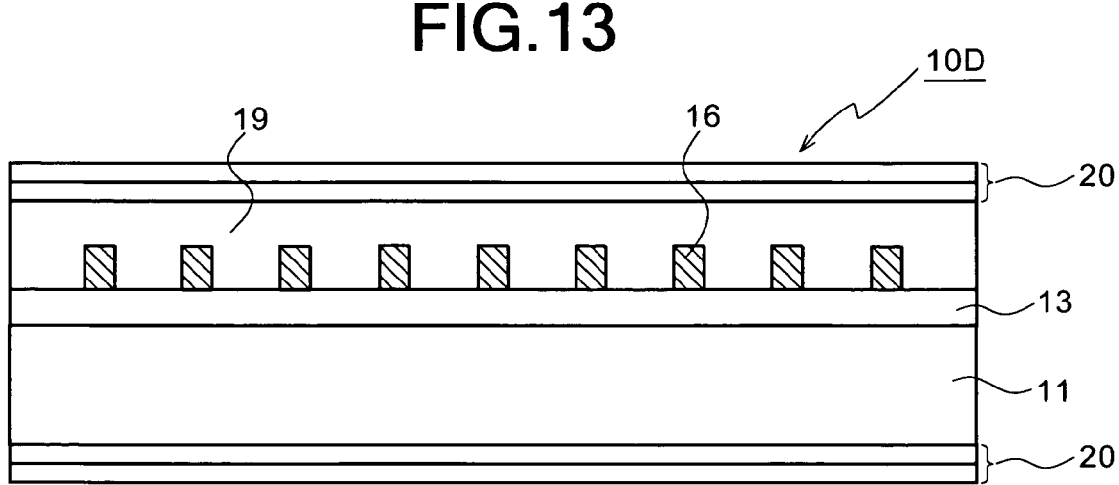
FIG. 13 is a sectional view of a wire grid polarizer in a first modified example in the third preferred embodiment.

Referring to FIGS. 11 through 13, the third preferred embodiment of the present invention will be described below. In this preferred embodiment, the glass substrate 11 is used as part of a polarizer without being peeled off.

First, in the third preferred embodiment, a hydrophilic thin film 13 being a transparent hydrophilic polymer thin film is formed on the glass substrate 11. Specifically, after a thin film, such as a resist, is spin-coated to be baked, the backed film is irradiated with ultraviolet or processed with plasma of argon (Ar) or the like, so that the hydrophilic thin film 13 can be formed. As an example of such a resist, Glassia (trade name), which is commercially available from Nippon Paint Co., Ltd., may be used.

Then, a hydrophobic thin film 14 is applied on the hydrophilic thin film 13 to be baked. Then, after a nano-imprint lithography process is carried out similar to the above described first preferred embodiment, metal fine wires 16 are selectively formed in metal thin wire forming grooves 15 by a plating method as shown in FIG. 11. Furthermore, in the nano-imprint lithography process, the same temperature control as that in the above described first preferred embodiment is carried out.

Then, the hydrophobic thin film 14 is removed with, e.g., $O_2$ Plasma or a releasing agent. Thereafter, as shown in FIG. 12, a transparent protective film 19 is formed on the hydrophilic thin film 13 and metal fine wires 16. Furthermore, the protective film 19 may be formed by depositing an inorganic material or spin-coating a polymer material. Thus, the production of a wire grid polarizer 10C shown in FIG. 12 is completed.

FIG. 13 shows a first modified example of the above described third preferred embodiment. As shown in FIG. 13, in a wire grid polarizer 10D in this modified example, a reflection reducing layer 20 of stacked dielectric layers is provided on each of the surface and reverse of the wire grid polarizer 10C in the third preferred embodiment. With such a construction, it is possible to provide a polarizer having excellent optical characteristics.

Figure 14:
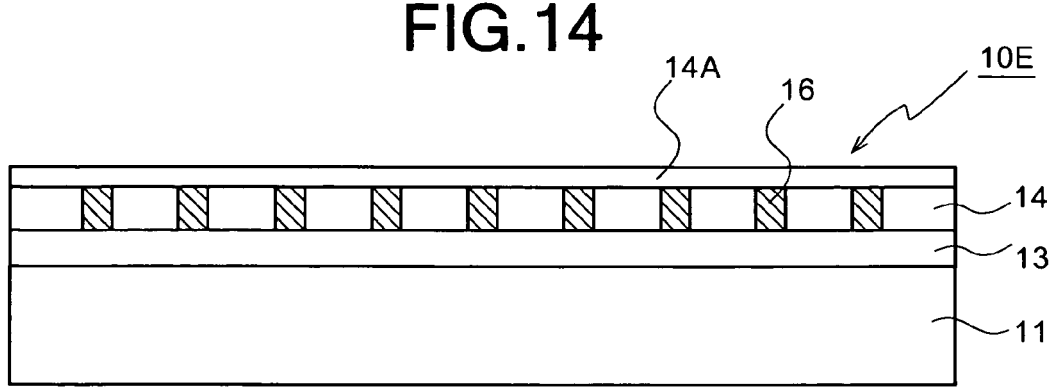
FIG. 14 is a sectional view of a wire grid polarizer in a second modified example in the third preferred embodiment.

FIG. 14 shows a second modified example 2 of the above described third preferred embodiment. In a wire grid polarizer 10E in this modified example, a protective film 14A of the same material as that of the hydrophobic thin film 14 is formed on the whole surface of the hydrophobic thin film 14 and metal fine wires 16 after the metal fine wires 16 are selectively formed in the metal fine wire forming grooves 15 by a plating method in the third preferred embodiment. The protective film 14A is formed by baking a spin-coated hydrophobic resin material.

According to such a producing method, it is not required to remove the hydrophobic thin film 14, so that it is possible to simplify the production process.

[Fourth Preferred Embodiment]

Figure 15:
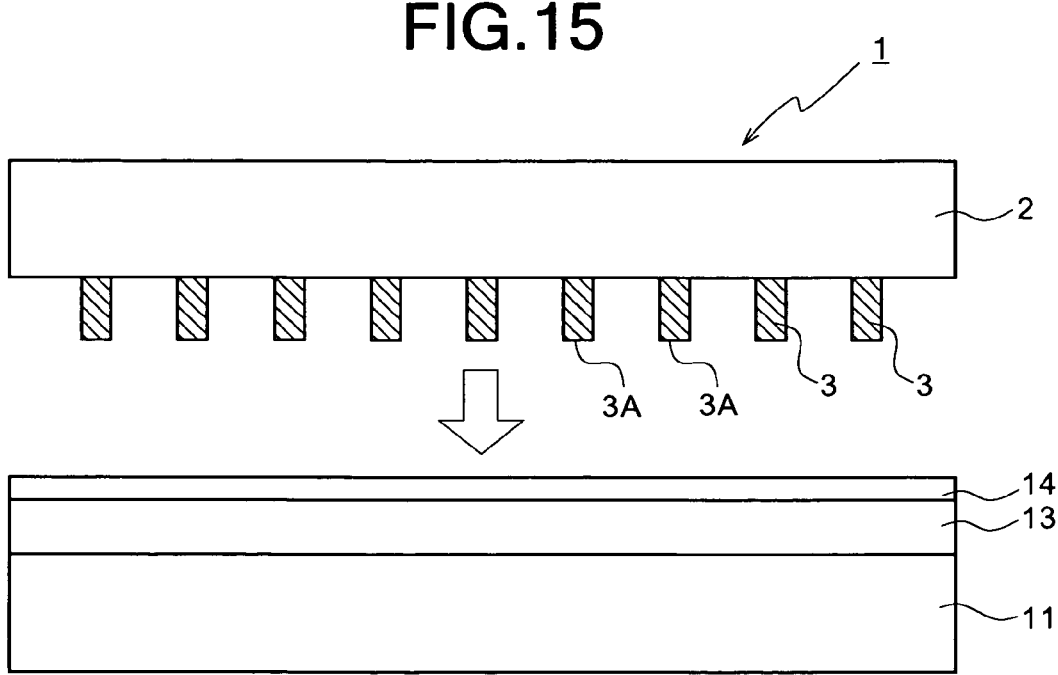
FIG. 15 is a sectional view of a step in the fourth preferred embodiment of a method for producing a wire grid polarizer according to the present invention (a state before a die is pressed in a nano-imprint lithography process)

FIGS. 15 through 19 show a method for producing the fourth preferred embodiment of a wire grid polarizer according to the present invention. In the fourth preferred embodiment, the same die 1 as that in the above described first preferred embodiment is used as shown in FIG. 15. That is, the die 1 has a plurality of groove forming protrusions 3, which are formed on one side of a die substrate 2 of silicon or quarts by working a metal thin film, as an inverted pattern of metal fine wires 16 to be worked. Furthermore, also in the die 1, the period of the groove forming protrusions 3 (the distance between the centers of adjacent two of the groove forming protrusions 3 in width directions) is set to be about 90 nm.

With respect to a substrate on which the nano-imprint lithography is to be carried out by the die 1, a hydrophilic thin film 13 of a transparent hydrophilic polymer thin film is formed on a glass substrate 11, and a hydrophobic thin film 14 is formed on the hydrophilic thin film 13. Furthermore, in this preferred embodiment, as shown in FIG. 15, the thickness of the hydrophobic thin film 14 is adjusted so as to be smaller than that of the hydrophilic thin film 13. In addition, the height of each of the groove forming protrusions 3 of the die 1 is set to be greater than the thickness of the hydrophobic thin film 14, so that the tip end faces 3A of the groove forming protrusions 3 reach the interior of the hydrophobic thin film 14 when the die 1 is pressed.

Figure 16:
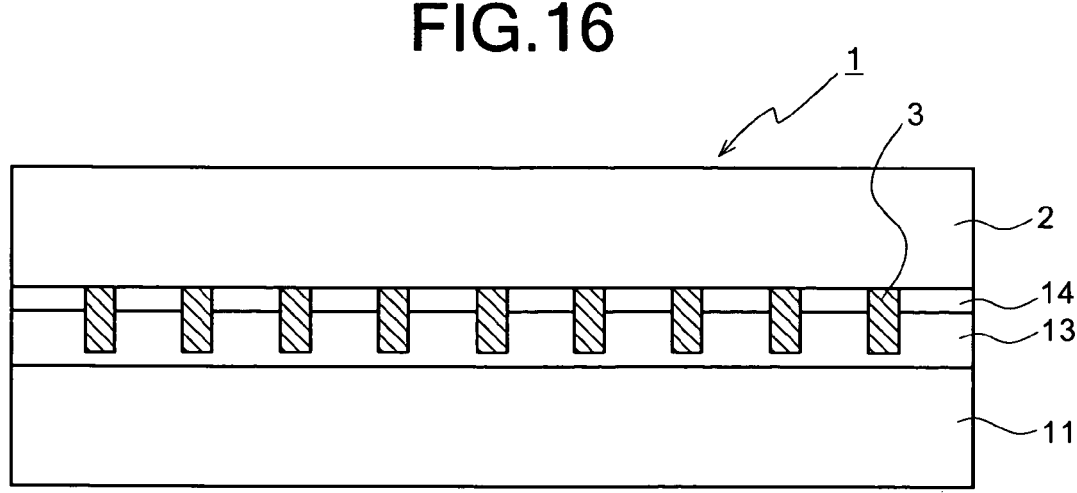
FIG. 16 is a sectional view showing a step in the fourth preferred embodiment of a method for producing a wire grid polarizer according to the present invention (a state that the die is pressed in the nano-imprint lithography process)
Figure 17:
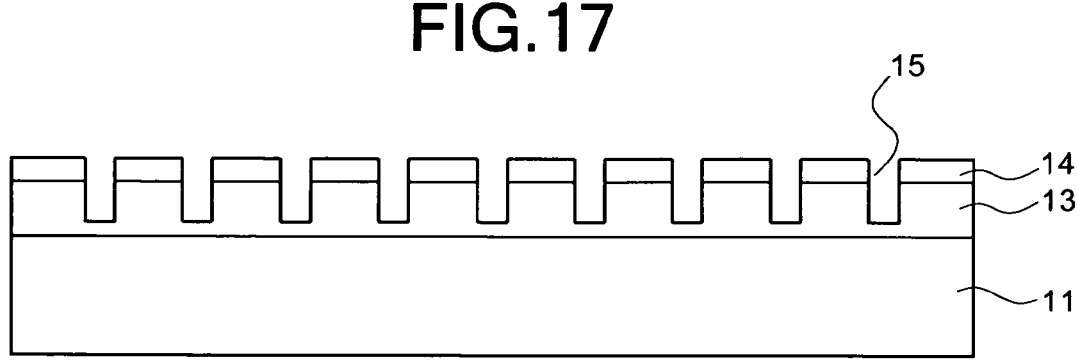
FIG. 17 is a sectional view showing a step in the fourth preferred embodiment of a method for producing a wire grid polarizer according to the present invention (a state that the die is removed in the nano-imprint lithography process)

First, a press machine (not shown) is used for moving the die 1 in a direction of thick arrow in FIG. 15 to press the die 1 on the glass substrate 11 as shown in FIG. 16. At this time, the tip end portions of the groove forming protrusions 3 reach the interior of the hydrophilic thin film 13. Therefore, as shown in FIG. 17, if the die 1 is removed, the hydrophilic thin film 13 is also recessed to form metal thin wire forming grooves 15 having inner wall surfaces defined by the hydrophilic thin film 13 and hydrophobic thin film 14. Furthermore, in such a nano-imprint lithography process, the same temperature control as that in the above described first preferred embodiment is carried out.

Figure 18:
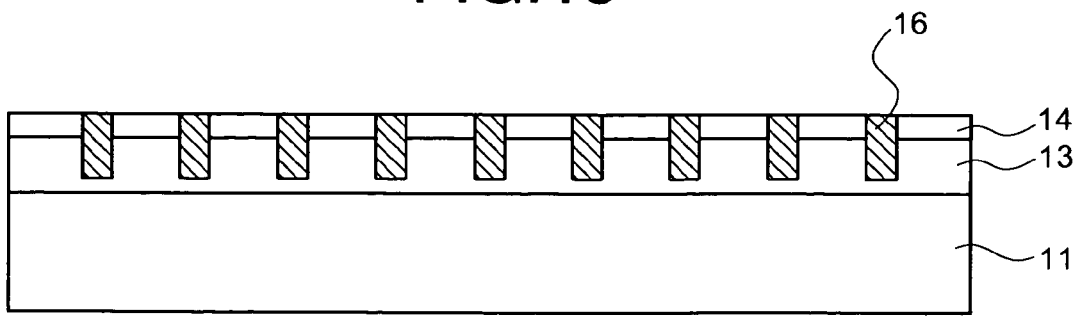
FIG. 18 is a sectional view showing a step (a plating step) in the fourth preferred embodiment of a method for producing a wire grid polarizer according to the present invention.

After such a nano-imprint lithography process is carried out, metal fine wires 16 are selectively formed in the metal fine wire forming grooves 15 by a plating method as shown in FIG. 18.

Figure 19:
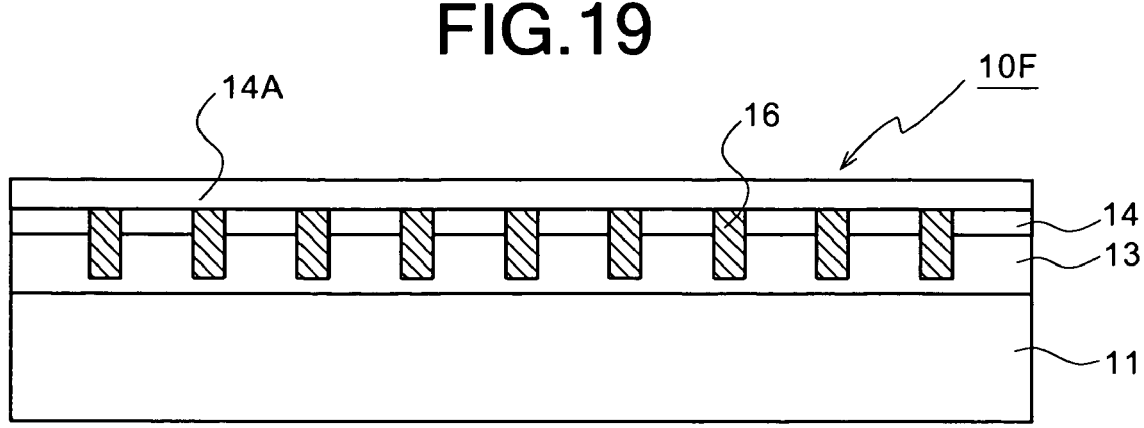
FIG. 19 is a sectional view of a wire grid polarizer in the fourth preferred embodiment.

Thereafter, a protective film 14A of the same material as that of the hydrophobic thin film 14 is formed on the whole surface of the hydrophobic thin film 14 and metal fine wires 16. The protective film 14A is formed by baking a spin-coated hydrophobic resin material. Thus, the production of a wire grid polarizer 10F in the fourth preferred embodiment is completed as shown in FIG. 19.

In the fourth preferred embodiment, since the groove forming protrusions 3 of the die 1 pass through the hydrophobic thin film 14 to reach the hydrophilic thin film 13, it is possible to increase the exposure area of the hydrophilic thin film 13 serving as a starting surface for growth of metal at the plating step, so that it is possible to surely carry out the growth of the metal fine wires 16.

Figure 20:
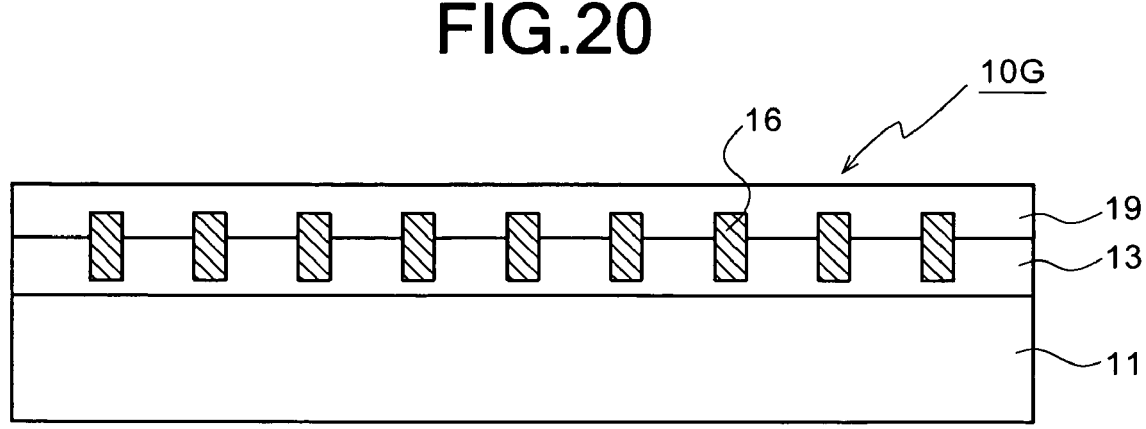
FIG. 20 is a sectional view of a wire grid polarizer in a modified example in the fourth preferred embodiment.

Referring to FIG. 20, a modified example of the fourth preferred embodiment will be described below.

While the protective film 14A has been formed on the whole surface of the hydrophobic thin film 14 and metal fine wires 16 in the above described fourth preferred embodiment, a transparent protective film 19 is formed on the hydrophilic thin film 13 and metal fine wires 16 in this modified example as shown in FIG. 20, by selectively removing the hydrophobic thin film 14 with, e.g., $O_2$ plasma or a releasing agent, after forming the metal fine wires 16. Furthermore, the protective film 19 may be formed by depositing an inorganic material or spin-coating a polymer material. Thus, the production of a wire grid polarizer 10G shown in FIG. 20 is completed.

In this modified example, after the metal fine wires 16 are formed, a material suitable for optical characteristics can be selected as the material of the protective film 19.

[Fifth Preferred Embodiment]

FIGS. 21 through 24 show a method for producing the fifth preferred embodiment of a wire grid polarizer according to the present invention.

Figure 21:
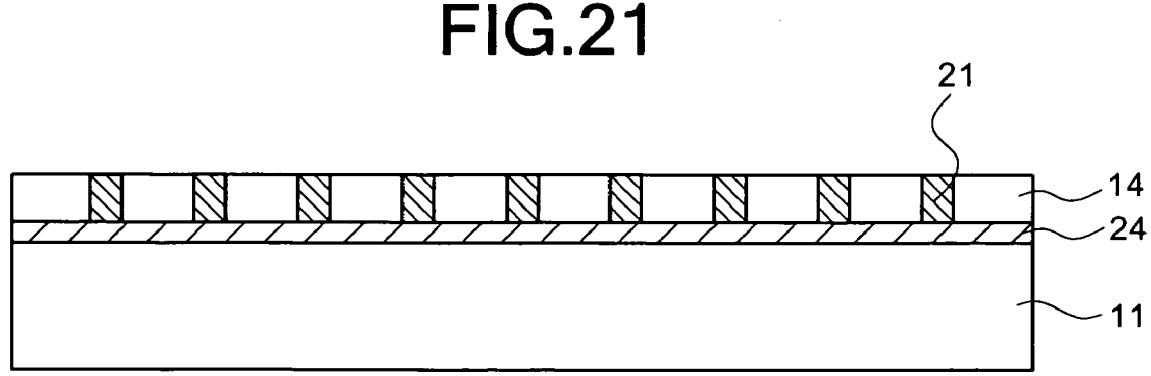
FIG. 21 is a sectional view showing a step (a plating step) in the fifth preferred embodiment of a method for producing a wire grid polarizer according to the present invention.

First, in the fifth preferred embodiment, as shown in FIG. 21, a metal film 24 of, e.g., nickel (Ni), is formed on a glass substrate 11 by a depositing method, such as the vapor deposition method, the sputtering method, the CVD method, the ion plating method or the electroless plating method. The metal film 24 functions as an underlayer, and serves as a starting material for the growth of metal fine wires 21 which will be described later.

Then, after a hydrophobic thin film 14 is formed on the metal film 24 by a technique, such as spin coating, a die (not shown) is pressed by the nano-imprint lithography method so that the groove forming protrusions of the die contact the metal film 24. In this nano-imprint lithography process, if the hydrophobic thin film 14 slightly remains on the metal film 24 in groove portions pressed by the groove forming protrusions, the $O_2$ plasma process is carried out to cause the underlying metal film 24 to be exposed. Thereafter, the glass substrate 11 is immersed in a plating solution to be plated. As a result, as shown in FIG. 21, the metal film 24 exposed in grooves formed in the hydrophobic thin film 14 is used as a nucleus for growth, so that metal thin wires 21 of, e.g., gold or silver, can growth.

Figure 22:
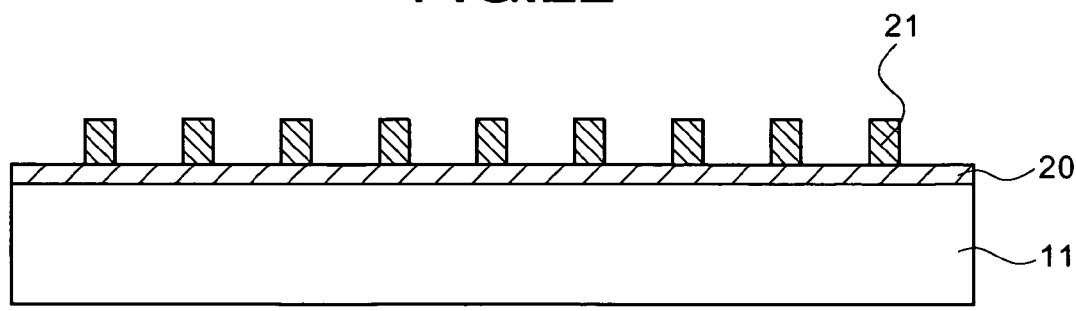
FIG. 22 is a sectional view showing a step in the fifth preferred embodiment of a method for producing a wire grid polarizer according to the present invention (a state that a hydrophobic thin film is removed)

Thereafter, as shown in FIG. 22, the hydrophobic thin film 14 is removed. In order to thus remove the hydrophobic thin film 14, the substrate may be immersed in an acid or alkali solution which does not dissolve the metal thin wires 21 and metal film 24 therein, or a dry etching, such as $O_2$ plasma etching, may be carried out.

Figure 23:
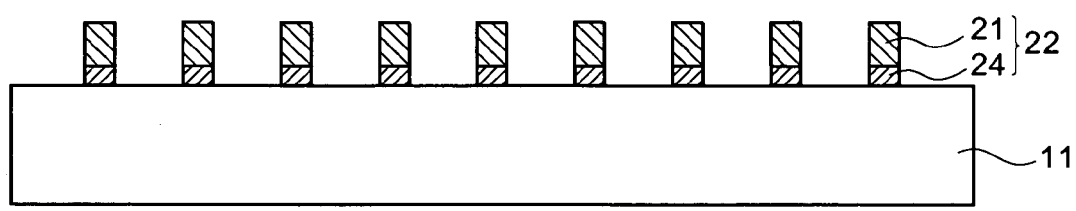
FIG. 23 is a sectional view showing a step (a metal film etching step) in the fifth preferred embodiment of a method for producing a wire grid polarizer according to the present invention.
Figure 24:
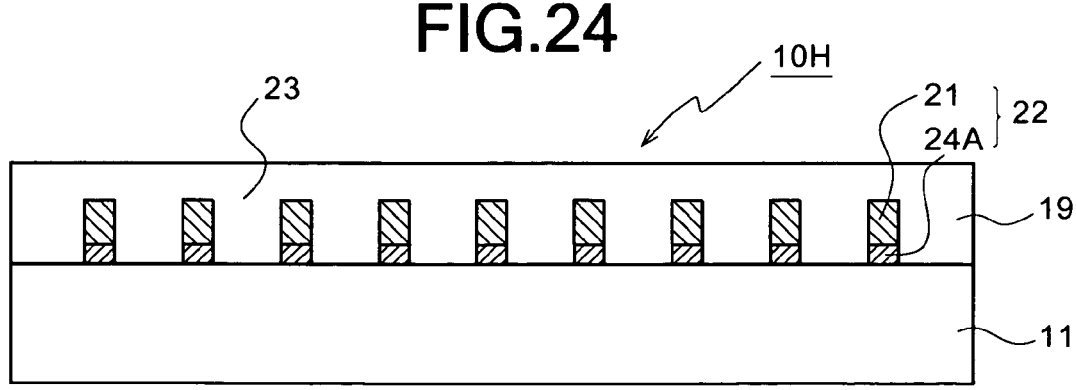
FIG. 24 is a sectional view of a wire grid polarizer in the fifth preferred embodiment.
Figure 25:
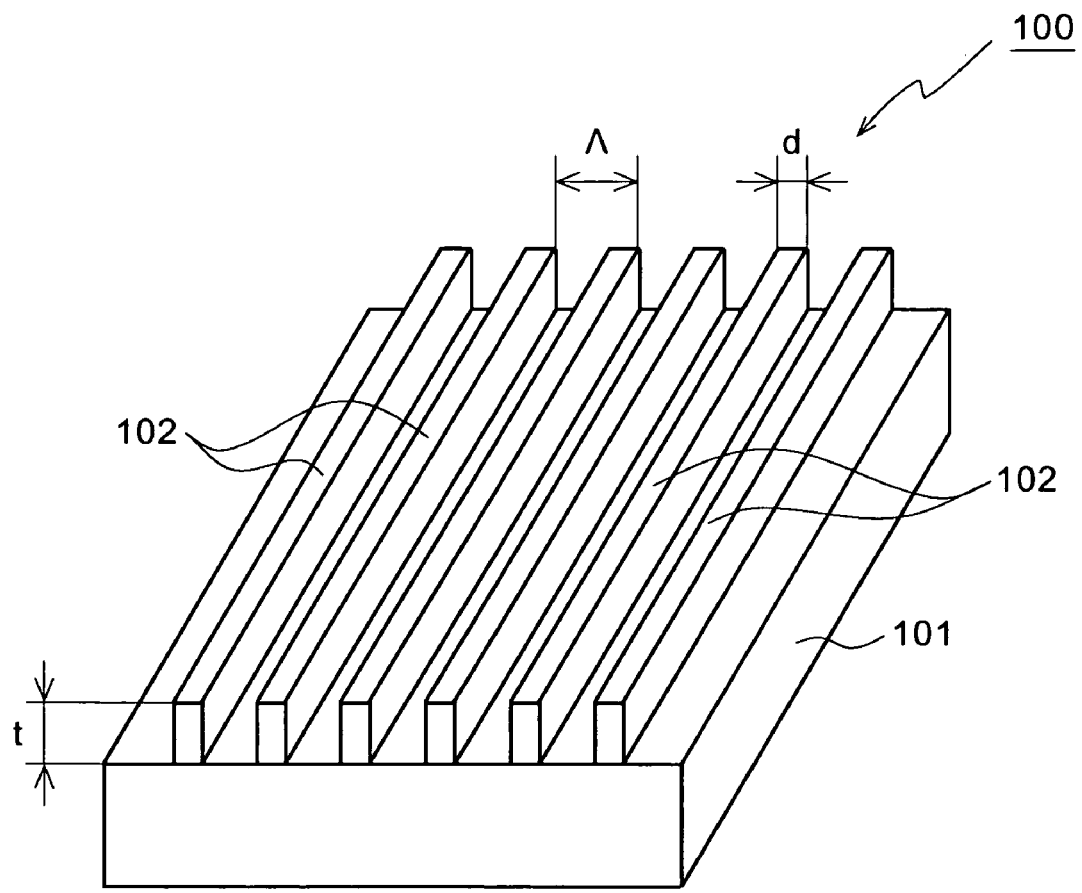
FIG. 25 is a perspective view showing a basic structure of a conventional wire grid polarizer.
Figure 26:
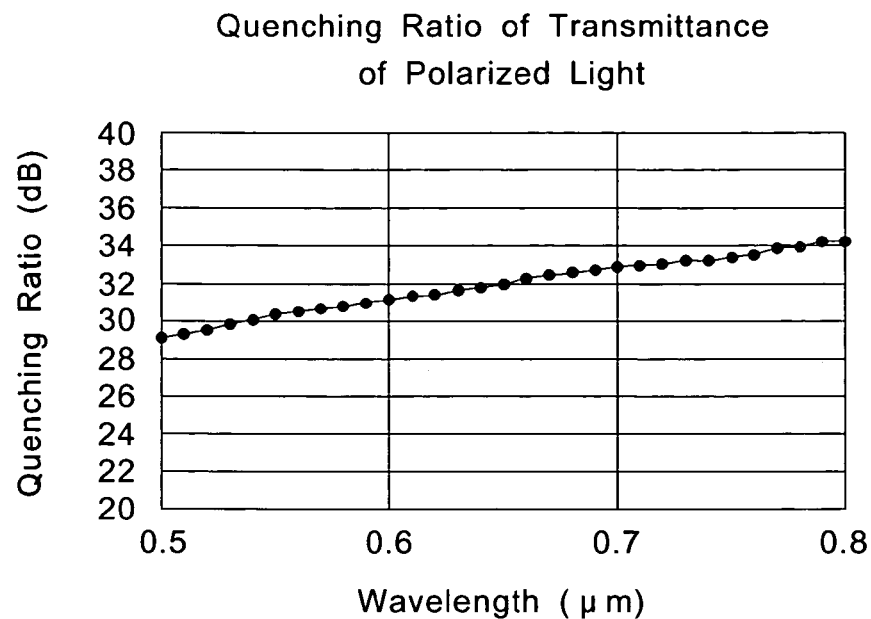
FIG. 26 is a graph showing characteristics of a wire grid polarizer predicted from the RCWA (the relationship between wavelength and quenching ratio) and FIG. 27 is a graph showing transmittance of each of p and s waves in a wavelength band of 50 to 800 nm.
Figure 27:
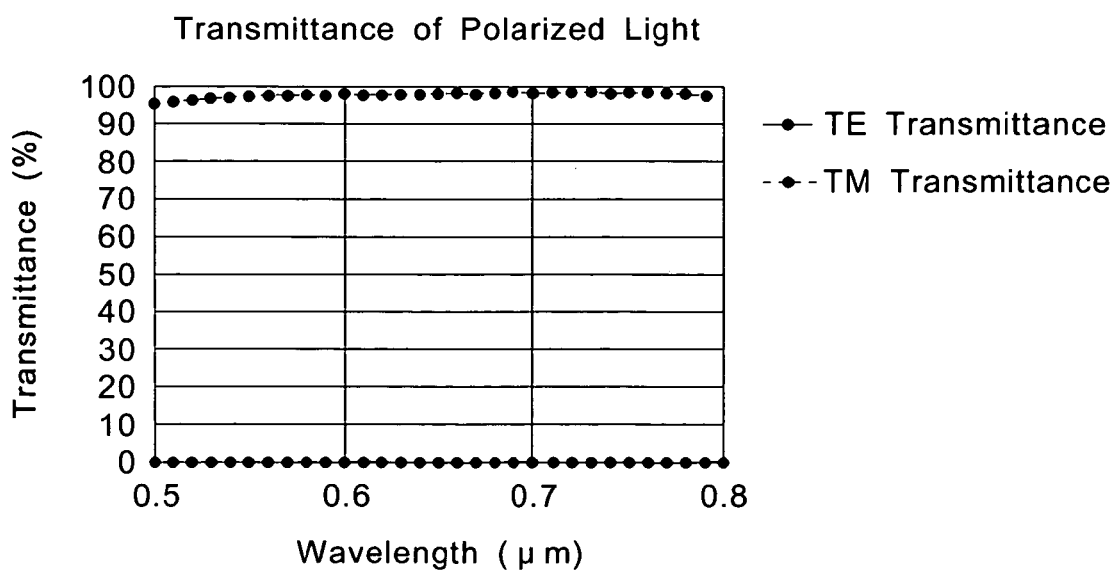

Then, as shown in FIG. 23, a wet etching is carried out by immersing the substrate in an acid or alkali solution which dissolves and removes exposed portions of the metal film 24 so as to leave the metal film 24A directly below the metal thin wires 21 without dissolving the metal fine wires 21. If the underlying metal film 24 is made of nickel and the metal fine wires 21 are made of gold or silver as in the fifth preferred embodiment, a mixed solution of hydrofluoric acid and nitric acid may be used as the solution. If the metal film 24 exposed between adjacent two of the metal fine wires 21 is thus removed, the metal thin wires 21 are stacked on the metal film 24A as shown in FIG. 23. The metal film 24A and the metal thin wires 21 constitute a wire grid 22.

Thereafter, a protective film 23 is formed on the whole surface of the glass substrate 11 on which the wire grid 22 is formed. The protective film 23 may be formed of a dielectric material or a polymer material by a technique suitable for these materials.

As described above, according to the present invention, it is possible to enhance the transmittance, quenching ratio and degree of polarization of a wire grid polarizer, and it is possible to produce the wire grid polarizer at low costs.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for producing a wire grid polarizer, said method comprising the steps of:
    forming an underlayer of a hydrophilic resin on a substrate;
    forming a thin film layer of a hydrophobic resin on said underlayer;
    preparing a die having a plurality of protrusions which extend in parallel to each other and which are spaced from each other at fine intervals;
    pressing said plurality of protrusions of said die on said thin film layer of the hydrophobic resin until said plurality of protrusions of said die reach said underlayer, to form a plurality of metal fine wire forming grooves in said thin film layer of the hydrophobic resin so that said underlayer is exposed at the bottom of each of said plurality of metal fine wire forming grooves; and
    forming each of a plurality of metal fine wires in a corresponding one of said plurality of metal fine wire forming grooves by a plating method.

2. A method for producing a wire grid polarizer as set forth in claim 1, which further comprises the steps of:
    forming a light transmissible mold releasing layer on said substrate before forming said underlayer, so as to allow said underlayer to be formed on said substrate via said light transmissible mold releasing layer; and
    removing said substrate from said light transmissible mold releasing layer after said plurality of metal fine wires are formed.

3. A method for producing a wire grid polarizer as set forth in claim 1, wherein said underlayer is a thin film of a light transmissible hydrophilic resin.

4. A method for producing a wire grid polarizer, said method comprising the steps of:
    forming a mold releasing layer on a substrate;
    forming a hydrophilic thin film layer of a hydrophilic resin on said mold releasing layer;
    forming a hydrophobic thin film layer of a hydrophobic resin on said hydrophilic thin film layer;
    preparing a die having a plurality of protrusions which extend in parallel to each other and which are spaced from each other at fine intervals;
    pressing said plurality of protrusions of said die on said hydrophobic thin film layer until said plurality of protrusions of said die reach said hydrophilic thin film layer, to form a plurality of metal fine wire forming grooves in said hydrophobic thin film layer so that said hydrophilic thin film layer is exposed at the bottom of each of said plurality of metal fine wire forming grooves;
    forming each of a plurality of metal fine wires in a corresponding one of said plurality of metal fine wire forming grooves by a plating method; and
    removing said substrate from said mold releasing layer after said plurality of metal fine wires are formed.

5. A method for producing a wire grid polarizer as set forth in claim 4, which further comprises the steps of:
    removing said hydrophobic thin film before removing said substrate from said mold releasing layer; and
    coating said hydrophilic thin film layer and said plurality of metal fine wires with a protective film after removing said hydrophobic thin film layer and before removing said substrate from said mold releasing layer.

6. A method for producing a wire grid polarizer as set forth in claim 4, which further comprises the step of: coating said hydrophobic thin film layer and said plurality of metal fine wires with a protective film before removing said substrate from said mold releasing layer.

7. A method for producing a wire grid polarizer, said method comprising the steps of:
    forming a hydrophilic thin film layer of a hydrophilic resin on a substrate;
    forming a hydrophobic thin film layer of a hydrophobic resin on said hydrophilic thin film layer;
    preparing a die having a plurality of protrusions which extend in parallel to each other and which are spaced from each other at fine intervals;
    pressing said plurality of protrusions of said die on said hydrophobic thin film layer until said plurality of protrusions of said die reach said hydrophilic thin film layer, to form a plurality of metal fine wire forming grooves in said hydrophobic thin film layer so that said hydrophilic thin film layer is exposed at the bottom of each of said plurality of metal fine wire forming grooves;
    forming each of a plurality of metal fine wires in a corresponding one of said plurality of metal fine wire forming grooves by a plating method;
    removing said hydrophobic thin film layer;
    coating said hydrophilic thin film layer and said plurality of metal fine wires with a protective film; and
    forming a reflection reducing layer on each of said protective film and said substrate.

8. A method for producing a wire grid polarizer, said method comprising the steps of:
    forming a hydrophilic thin film layer of a hydrophilic resin on a substrate;
    forming a hydrophobic thin film layer of a hydrophobic resin on said hydrophilic thin film layer;
    preparing a die having a plurality of protrusions which extend in parallel to each other and which are spaced from each other at fine intervals;
    pressing said plurality of protrusions of said die on said hydrophobic thin film layer until said plurality of protrusions of said die reach said hydrophilic thin film layer, to form a plurality of metal fine wire forming grooves in said hydrophobic thin film layer so that said hydrophilic thin film layer is exposed at the bottom of each of said plurality of metal fine wire forming grooves;
    forming each of a plurality of metal fine wires in a corresponding one of said plurality of metal fine wire forming grooves by a plating method; and
    coating said hydrophobic thin film layer and said plurality of metal fine wires with a protective film of the same material as that of said hydrophobic resin.

9. A method for producing a wire grid polarizer, said method comprising the steps of:
    forming a hydrophilic thin film layer of a hydrophilic resin on a substrate;
    forming a hydrophobic thin film layer of a hydrophobic resin on said hydrophilic thin film layer;
    preparing a die having a plurality of protrusions which extend in parallel to each other and which are spaced from each other at fine intervals;
    pressing said plurality of protrusions of said die on said hydrophobic thin film layer until tip portions of said plurality of protrusions of said die pass through said hydrophobic thin film layer into said hydrophilic thin film layer, to form a plurality of metal fine wire forming grooves in said hydrophobic and hydrophilic thin film layers;

forming each of a plurality of metal fine wires in a corresponding one of said plurality of metal fine wire forming grooves by a plating method; and coating said hydrophobic thin film layer and said plurality of metal fine wires with a protective film of the same material as that of said hydrophobic resin.

10. A method for producing a wire grid polarizer, said method comprising the steps of:

forming a hydrophilic thin film layer of a hydrophilic resin on a substrate;

forming a hydrophobic thin film layer of a hydrophobic resin on said hydrophilic thin film layer;

preparing a die having a plurality of protrusions which extend in parallel to each other and which are spaced from each other at fine intervals;

pressing said plurality of protrusions of said die on said hydrophobic thin film layer until tip portions of said plurality of protrusions of said die pass through said hydrophobic thin film layer into said hydrophilic thin film layer, to form a plurality of metal fine wire forming grooves in said hydrophobic and hydrophobic thin film layers;

forming each of a plurality of metal fine wires in a corresponding one of said plurality of metal fine wire forming grooves by a plating method;

removing said hydrophobic thin film layer; and coating said hydrophilic thin film layer and said plurality of metal fine wires with a protective film.

11. A method for producing a wire grid polarizer, said method comprising the steps of:

forming a metal film layer on a substrate;

forming a hydrophobic thin film layer of a hydrophobic resin on said metal film;

preparing a die having a plurality of protrusions which extend in parallel to each other and which are spaced from each other at fine intervals;

pressing said plurality of protrusions of said die on said hydrophobic thin film layer until said plurality of protrusions of said die reach said metal film layer, to form a plurality of metal fine wire forming grooves in said hydrophobic thin film layer so that said metal film layer is exposed at the bottom of each of said plurality of metal fine wire forming grooves;

forming each of a plurality of metal fine wires in a corresponding one of said plurality of metal fine wire forming grooves by a plating method;

removing portions of said metal film layer, on which said plurality of metal fine wires are not formed; and coating said plurality of metal fine wires, the remaining portions of said metal film layer and said substrate with a protective film.

* * * * *